Jan. 23, 1940.  H. R. MARK  2,187,884
PUMP ROD, COUPLING AND METHOD OF MAKING THE SAME
Filed March 6, 1937
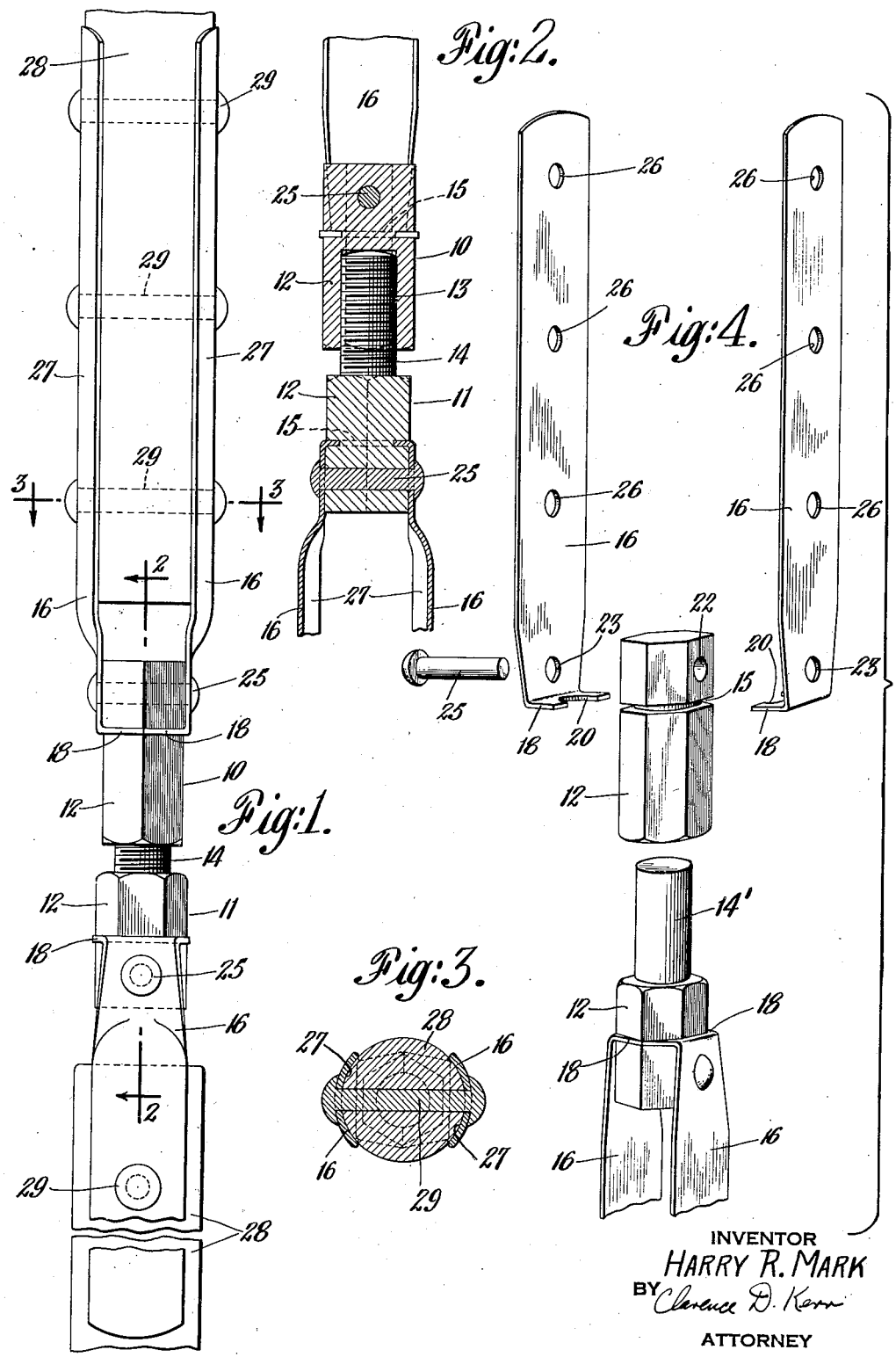
INVENTOR
HARRY R. MARK
BY
ATTORNEY Patented Jan. 23, 1940

2,187,884

UNITED STATES PATENT OFFICE 2,187,884

PUMP ROD COUPLING AND METHOD OF MAKING THE SAME

Harry R. Mark, Evanston, Ill., assignor to Clayton Mark & Company, Chicago, Ill., a corporation of Delaware Application March 6, 1937, Serial No. 129,298

11 Claims. (Cl. 29—148)

This invention relates to a coupling for pump rods and the like which is simple and compact and which may be used to connect two rods in butt relationship. The use of wooden rods for water pumps, particularly rods of polygonal cross section, is very advantageous both from the standpoint of lower cost and lower weight than metal rods. Such wooden rods however, present some difficulty in coupling, and coupling members used for this purpose must be firmly attached to the rods and of sufficient strength to support the rods, at least to some extent.

I have invented a coupling which may be readily employed with wooden pump rods, as well as metal and other rods, to support the same and lessen the tendency thereof to buckle under severe strains, as when they are employed with double acting cylinders.

One object of the invention is to provide a coupling which may be readily attached to and detached from the rod without disassembling the whole coupling unit.

Another object of this invention is to provide an improved and practical method of manufacturing and assembling such pump rod coupling units.

A further object of the invention is a simple form of coupling which may be made with a minimum of operations and from commercially available materials. Further objects and advantages of the invention will be more apparent from a detailed description of the embodiment thereof illustrated in the drawing, in which:

Figure 1 is a side elevation of a pair of my improved couplings connected together showing the ends of rods attached to the coupling members.

Figure 2 is a vertical cross section through the center of the coupling members shown in Figure 1 and taken on the line 2—2 of Figure 1.

Figure 3 is a horizontal cross section through the wing straps and rod attached thereto, taken on the line 3—3 of Figure 1.

Figure 4 is a perspective view showing the parts of one coupling member assembled and the parts of the other coupling member in position for assembly.

The coupling members 10 and 11, shown in the drawing, are each formed with a body portion 12. Coupling member 10 is preferably internally threaded as at 13 and the other of said coupling members 11 is provided with a threaded shank 14 so that the two coupling members may be readily attached and detached. Each of the body portions 12 is provided with circumferential groove 15 near one end thereof and may be polygonal in cross section if desired. A pair of wing straps 16, 16 are preferably formed with one end 18 bent at right angles to the main portion thereof for attaching the straps to the body portion 12. These ends 18 may also be provided with semi-circular openings 20 for cooperation with the groove 15. The straps are thereby adapted to fit snugly against the body portion 12, and the legs of the ends 18 may be so proportioned in conjunction with the circumferential groove 15 that they completely fill said groove and surround the body portion. The body portion may be provided with an opening 22 adjacent the groove 15 and the wing straps 16 may be provided with holes 23 adapted to be aligned when the parts are assembled so that a rivet or bolt 25 may be passed through the three members to securely hold the same in assembled position. By making the body portion of polygonal cross section, the flat ends of the wing straps cooperate therewith more effectively, and a purchase is also afforded for a wrench in connecting or disconnecting the coupling members. The wing straps may be perfectly flat throughout their length, as illustrated in Figure 4, and provided with a plurality of holes 26. In this form they may be attached to square wooden rods and the like; or the straps may be formed with a curved inner surface, as illustrated at 27, for joining to the end of round rods 28 by means of rivets or bolts 29. In fact, the straps may be made in any desirable shape to cooperate with the shape of the rods to which they are to be connected.

In producing couplings and coupling members of the type described, the body portions 12 may be made in the form of blanks, that is with a shank 14' which is not threaded, or with a recess which is also perfectly plain and of slightly larger and smaller dimensions, respectively, than will ultimately be required. Such body members may be readily produced from ordinary screw stock or long rods of the desired shape and size; such stock may be rough machined very easily on automatic machinery although other methods of producing the blanks may be employed. The strap members may be readily formed by a stamping operation performed on flat strip metal.

In assembling a coupling member, two of the straps are interlocked with a body member and secured in place by a rivet or bolt 25. The whole coupling member is now preferably galvanized, or otherwise coated, as by dipping in the usual manner in a pot of molten zinc or zinc alloy. After the coating material has properly solidified and cooled, it will be found that the coupling member is securely and rigidly held in assembled position since the molten metal works into the joints and solidifies to materially strengthen the assembly. Shank 14' on the male body members and the corresponding recess in the female body members may now be suitably threaded in any desired manner and the coupling is ready for use. Such a construction may be quickly and effectively assembled by means of a single bolt and provides adequate support for a rod such as a pump rod.

This coupling has the further important advantage that the rods may be readily removed and changed without dis-assembling the whole coupling member.

Galvanizing or coating the coupling member after assembly has a dual function. By the employment of simple interlocking parts, the coating metal serves as an effective soldering agent binding the parts together. In addition the parts may be advantageously made of a low carbon steel which is prevented from rusting during use. Although hot galvanizing is preferred, other types of metal coatings may also be employed for holding the parts securely together, such as sprayed or plated coatings, and other metals than zinc may be used for this purpose.

While the coupling members have been desired as having threaded shanks and recesses for joining two coupling members together, any suitable means may be employed at the end of the body members for this purpose.

The terms and expressions which I have employed are used as terms of description and not of limitation, and I have no intention, in the use of such terms and expressions of excluding any equivalents of the features shown and described, or portions thereof, but recognize that various modifications are possible within the scope of the invention claimed.

I claim:

1. A coupling member for attaching to the end of a rod comprising a body portion having means at one end for detachably connecting said member to another coupling member, a plurality of elongated strap members shaped to cooperate with the rod, said strap members having an end portion cooperating with said body portion in interlocking engagement, and a single means extending through only said body portion and strap members for holding said parts in assembled position.

2. A coupling member for attaching to the end of a rod comprising a body portion having means at one end for detachably connecting said member to another coupling member, a plurality of elongated strap members shaped to cooperate with the rod, said strap members having an end portion cooperating with said body portion in interlocking engagement, means for holding said body portion and strap members in assembled position, and means separate from said holding means for attaching said strap members to the rod, said portion and strap members being further secured together by a protective metal coating applied and solidified thereon after assembly.

3. A coupling member for attaching to the end of a rod comprising a body portion having means at one end for detachably connecting said member to another coupling member, said body portion being formed intermediate the ends thereof with a groove extending around its periphery, a plurality of strap members formed at one end with a pair of inwardly extending legs adapted to fit into said groove and embrace said body portion, and a member extending through said body portion and strap members for holding said parts in assembled position, said parts being further secured together by a metal coating applied and solidified on said parts after assembly.

4. A coupling member for attaching to the end of a rod comprising a body portion having means at one end for detachably connecting said member to another coupling member, said body portion being formed intermediate the ends thereof with a groove extending around its periphery and of such a depth that a cross section of the body portion through this groove is circular in outline, strap members formed at one end with a pair of inwardly extending legs adapted to fit into said groove and embrace said body portion, a rivet constituting the sole means passing through said body portion and members for holding said body portion and strap members in assembled position, and means separate from said rivet for attaching said strap members to the rod.

5. A coupling member for attaching to the end of a rod comprising a body portion having means at one end for detachably connecting said member to another coupling member, a plurality of elongated strap members shaped to cooperate with the rod, said strap members having an end portion cooperating with said body portion in interlocking engagement, and means extending through only said strap members and body portion for holding said parts in assembled relationship, said strap members and body portion being further secured together by a metal coating applied after assembly.

6. A coupling member for attaching to the end of a rod comprising a body portion having means at one end for detachably connecting said member to another coupling member, a plurality of elongated strap members shaped to cooperate with the rod, said strap members each having an end portion cooperating with said body portion in interlocking engagement, and means extending through only said strap members and body portion for holding said parts in assembled relationship, said body portion and strap members being galvanized to assist in holding the parts in assembled position.

7. In a method of manufacturing coupling members the steps of forming a body portion, shaping a plurality of elongated strap members for interlocking engagement with said body portion, assembling said body portion and strap members, and coating the assembled coupling member with metal solidified in place to rigidly secure the parts in assembled position.

8. In a method of manufacturing coupling members the steps of forming a body portion, shaping a plurality of elongated strap members for interlocking engagement with said body portion, assembling said body portion and strap members, securing the parts together in assembled position, and dipping the assembled coupling member in a bath of molten metal to rigidly secure the parts in assembled position.

9. In a method of manufacturing coupling members the steps of forming a body portion, shaping a plurality of elongated strap members for interlocking engagement with said body portion, assembling said body portion and strap members, dipping the assembled coupling member in a bath of molten metal to rigidly secure the parts in assembled position, and threading one end of said metal coated body portion.

10. In a method of manufacturing coupling members the steps of forming a body portion with a plain shank at one end, shaping a plurality of elongated strap members for interlocking engagement with said body portion, assembling said body portion and strap members, riveting said parts together, dipping the assembled coupling member in a molten galvanizing bath, and threading said shank.

11. In a method of manufacturing coupling members the steps of forming a body portion with a recess at one end, shaping a plurality of elongated strap members for interlocking engagement with said body portion, assembling said body portion and strap members, riveting said parts together, dipping the assembled coupling member in a molten galvanizing bath, and threading the walls of said recess.

HARRY R. MARK.